(12) United States Patent  (10) Patent No.: US 7,978,592 B2
Aghili et al.  (45) Date of Patent: Jul. 12, 2011

(54) METHOD AND APPARATUS FOR SIGNALING IN MULTIPLE USER ONE-SLOT OPERATION IN WIRELESS COMMUNICATION

(75) Inventors: Behrouz Aghili, Melville, NY (US); Marian Rudolf, Montreal (CA)

(73) Assignee: InterDigital Patent Holdings, Inc., Wilmington, DE (US)

( * ) Notice: Subject to any disclaimer, the term of this patent is extended or adjusted under 35 U.S.C. 154(b) by 256 days.

(21) Appl. No.: 12/328,951

(22) Filed: Dec. 5, 2008

(65) Prior Publication Data

US 2009/0201880 A1    Aug. 13, 2009

Related U.S. Application Data

(60) Provisional application No. 60/992,938, filed on Dec. 6, 2007.

(51) Int. Cl.
*H04J 9/00* (2006.01)
*H04W 4/00* (2009.01)

(52) U.S. Cl. ......... 370/205; 370/314; 370/442; 375/238

(58) Field of Classification Search ........................ None
See application file for complete search history.

(56) References Cited

U.S. PATENT DOCUMENTS

| 2006/0204171 A1* | 9/2006 | Cai et al. ...................... 385/24 |
| 2008/0089278 A1* | 4/2008 | Chang et al. ................. 370/329 |
| 2008/0096506 A1* | 4/2008 | Nguyen et al. ............. 455/187.1 |

FOREIGN PATENT DOCUMENTS

WO    98/26625    6/1998

OTHER PUBLICATIONS

ETSI TS 125 331 V3.9.0, Release 1999, UMTS RRC protocol specification, Dec. 2001, pp. 1, 56, 63, 80, 285, 516.*
Catt, "Some Small Editorial Corrections To TS 25.321", Change Request, 25.321 CR, Current Version 7.4.0, GPP TSG-RAN2 Meeting #58, R2-071860, (Kobe, Japan, May 7-11, 2007).
China Mobile et al., "Multi-User Reusing-One-Short (MUROS)", 3GPP TSG GERAN #36, GP-072027, Agenda Item 6.1, 7.1.5.18, (Vancouver, Canada, Nov. 12-16, 2007).

(Continued)

*Primary Examiner* — Jianye Wu
(74) *Attorney, Agent, or Firm* — Volpe and Koenig, P.C.

(57) ABSTRACT

Disclosed are multiple embodiments of method and apparatus to facilitate Multiple Users Reusing One Timeslot (MUROS) operation in wireless communications. A pair of wireless transmit/receive units (WTRUs) may be multiplexed onto a timeslot using a same pulse format. A WTRU may communicate on a network using MUROS technology both on the downlink (DL) and the uplink (UL), and may use a first pulse format on the DL and a second different pulse format on the UL. Pulse format support information to facilitate MUROS operation may be communicated between a network and a WTRU. The support information may be communicated in Radio Resource Control (RRC) messages. A network may allow for concurrent operation of WTRUs using different types of MUROS technology. For example, a network may include WTRUs using MUROS based on orthogonal sub-channels (OSC) while other WTRUs use MUROS based on an interference-canceling technology such as Downlink Advanced Receiver Performance (DARP) Phase I or Phase II.

15 Claims, 4 Drawing Sheets

OTHER PUBLICATIONS

Nokia et al., "Pulse Shape Signalling For EGPRS2B Uplink" 3GPP TSG-GERAN#38 Meeting, GP-080908, (Malaga, Spain, May 12-16, 2008).

Nokia Siemens Netowrks et al., "Pulse Shape Signalling For EGPRS2B Uplink" 3GPP TSG-GERAN#37 Meeting, GP-080235, (Seoul, South Korea, Feb. 18-22, 2008).

Nokia Siemens Netowrks et al., "Pulse Shape Signalling For EGPRS2B Uplink" 3GPP TSG-GERAN#38 Meeting, GP-080907, (Malaga, Spain, May 12-16, 2008).

Nokia Siemens Netowrks et al., "Voice Capacity Evolution With Orthogononal Sub Channels", 3GPP TSG GERAN #36 Meeting, Tdoc GP-071792, (Vancouver, Canada, Nov. 12-16, 2007).

Nokia, "Voice Capacity Evolution With Orthogonal Sub Channel", 3GPP TSG-GERAN Meeting #33, GP-070214, (Seoul, South Korea, Feb. 12-16, 2007).

Nokia, "Voice Capacity Evolution with Orthogonal Sub Channel", Change Request, 45.912 CR CRNum, Current Version 7.1.0, 3GPP TSG-GERAN Meeting #33, GP-070214, (Seoul, South Korea, Feb. 12-16, 2007).

Qualcomm Europe, "Speech Capacity Enhancement Using DARP", 3GPP TSG-GERAN #36 Meeting, GP-071738, (Vancouver, Canada, Nov. 12-16, 2007).

Telefon AB LM Ericsson, "Frequency Hopping Schemes For MUROS", 3GPP TSG GERAN WG1 Ad Hoc, AGH1-080019, (Sophia Antipolis, France, Apr. 8-11, 2008).

Telefon AB LM Ericsson, "Link Performance of Orthogonal Sub Channels with Narrow Pulse Shaping Filter", 3GPP TSG GERAN #36, GP-071721, Agenda Item 7.1.5.17, (Vancouver, Canada, Nov. 12-16, 2007).

Telefon AB LM Ericsson, "On Orthogonal Sub Channels", 3GPP TSG GERAN #36 Meeting, GP-071720, (Vancouver, Canada, Nov. 12-16, 2007).

Third Generation Partnership Project, "Technical Specification Group GSM/EDGE Radio Access Network; General Packet Radio Service (GPRS); Mobile Station (MA)—Base Station System (BSS) Interface; Radio Link Control/Medium Access Control (RLC/MAC) Protocol (Release 7)", 3GPP TS 44.060 V7.10.0, (Sep. 2007).

Third Generation Partnership Project, "Technical Specification Group GSM/EDGE Radio Access Network; General Packet Radio Service (GPRS); Mobile Station (MA)—Base Station System (BSS) Interface; Radio Link Control/Medium Access Control (RLC/MAC) Protocol (Release 7)", 3GPP TS 44.060 V7.14.0, (Sep. 2008).

Third Generation Partnership Project, "Technical Specification Group GSM/EDGE Radio Access Network; General Packet Radio Service (GPRS); Mobile Station (MA)—Base Station System (BSS) Interface; Radio Link Control/Medium Access Control (RLC/MAC) Protocol (Release 8)", 3GPP TS 44.060 V8.2.0, (Sep. 2008).

Third Generation Partnership Project, "Technical Specification Group GSM/EDGE Radio Access Network; Mobile Radio Interface Layer 3 Specification; Radio Resource Control (RRC) Protocol (Release 7)", 3GPP TS 44.018 V7.10.0, (Sep. 2007).

Third Generation Partnership Project, "Technical Specification Group GSM/EDGE Radio Access Network; Mobile Radio Interface Layer 3 Specification; Radio Resource Control (RRC) Protocol (Release 7)", 3GPP TS 44.018 V7.14.0, (Sep. 2008).

Third Generation Partnership Project, "Technical Specification Group GSM/EDGE Radio Access Network; Mobile Radio Interface Layer 3 Specification; Radio Resource Control (RRC) Protocol (Release 8)", 3GPP TS 44.018 V8.0.0, (Sep. 2007).

Third Generation Partnership Project, "Technical Specification Group GSM/EDGE Radio Access Network; Mobile Radio Interface Layer 3 Specification; Radio Resource Control (RRC) Protocol (Release 8)", 3GPP TS 44.018 V8.4.0, (Sep. 2008).

ZTE Corporation, "Discussion Paper On OSC", 3GPP TSG GERAN #36 Meeting, GP-071785, (Vancouver, Canada, Nov. 12-16, 2007).

"Optimized Transmit Pulse Shape for Downlink EGPRS2-B," 3GPP TSG GERAN, GP-072026 Meeting #36 (Nov. 12-16, 2007).\

"Optimized Transmit Pulse Shape for Downlink EGPRS2-B," 3GPP TSG GERAN, GP-071900 Meeting #36 (Nov. 12-16, 2007).\

Catt, "Some Small Editorial Corrections To TS 25.321", Change Request, 25.321 CR, Current Version 7.4.0, GPP TSG-RAN2 Meeting #58, R2-071860, (Kobe, Japan, May 7-11, 2007).

China Mobile et al., "Multi-User Reusing-One-Short (MUROS)", 3GPP TSG GERAN #36, GP-072027, Agenda Item 6.1, 7.1.5.18, (Vancouver, Canada, Nov. 12-16, 2007).

Nokia et al., "Pulse Shape Signalling For EGPRS2B Uplink" 3GPP TSG-GERAN#38 Meeting, GP-080908, (Malaga, Spain, May 12-16, 2008).

Nokia Siemens Netowrks et al., "Pulse Shape Signalling For EGPRS2B Uplink" 3GPP TSG-GERAN#37 Meeting, GP-080235, (Seoul, South Korea, Feb. 18-22, 2008).

Nokia Siemens Netowrks et al., "Pulse Shape Signalling For EGPRS2B Uplink" 3GPP TSG-GERAN#38 Meeting, GP-080907, (Malaga, Spain, May 12-16, 2008).

Nokia Siemens Netowrks et al., "Voice Capacity Evolution With Orthogononal Sub Channels", 3GPP TSG GERAN #36 Meeting, Tdoc GP-071792, (Vancouver, Canada, Nov. 12-16, 2007).

Nokia, "Voice Capacity Evolution With Orthogonal Sub Channel", 3GPP TSG-GERAN Meeting #33, GP-070214, (Seoul, South Korea, Feb. 12-16, 2007).

Nokia, "Voice Capacity Evolution with Orthogonal Sub Channel", Change Request, 45.912 CR CRNum, Current Version 7.1.0, 3GPP TSG-GERAN Meeting #33, GP-070214, (Seoul, South Korea, Feb. 12-16, 2007).

Qualcomm Europe, "Speech Capacity Enhancement Using DARP", 3GPP TSG-GERAN #36 Meeting, GP-071738, (Vancouver, Canada, Nov. 12-16, 2007).

Telefon AB LM Ericsson, "Frequency Hopping Schemes For MUROS", 3GPP TSG GERAN WG1 Ad Hoc, AGH1-080019, (Sophia Antipolis, France, Apr. 8-11, 2008).

Telefon AB LM Ericsson, "Link Performance of Orthogonal Sub Channels with Narrow Pulse Shaping Filter", 3GPP TSG GERAN #36, GP-071721, Agenda Item 7.1.5.17, (Vancouver, Canada, Nov. 12-16, 2007).

Telefon AB LM Ericsson, "On Orthogonal Sub Channels", 3GPP TSG GERAN #36 Meeting, GP-071720, (Vancouver, Canada, Nov. 12-16, 2007).

Third Generation Partnership Project, "Technical Specification Group GSM/EDGE Radio Access Network; General Packet Radio Service (GPRS); Mobile Station (MA)—Base Station System (BSS) Interface; Radio Link Control/Medium Access Control (RLC/MAC) Protocol (Release 7)", 3GPP TS 44.060 V7.10.0, (Sep. 2007).

Third Generation Partnership Project, "Technical Specification Group GSM/EDGE Radio Access Network; General Packet Radio Service (GPRS); Mobile Station (MA)—Base Station System (BSS) Interface; Radio Link Control/Medium Access Control (RLC/MAC) Protocol (Release 7)", 3GPP TS 44.060 V7.14.0, (Sep. 2008).

Third Generation Partnership Project, "Technical Specification Group GSM/EDGE Radio Access Network; General Packet Radio Service (GPRS); Mobile Station (MA)—Base Station System (BSS) Interface; Radio Link Control/Medium Access Control (RLC/MAC) Protocol (Release 8)", 3GPP TS 44.060 V8.2.0, (Sep. 2008).

Third Generation Partnership Project, "Technical Specification Group GSM/EDGE Radio Access Network; Mobile Radio Interface Layer 3 Specification; Radio Resource Control (RRC) Protocol (Release 7)", 3GPP TS 44.018 V7.10.0, (Sep. 2007).

Third Generation Partnership Project, "Technical Specification Group GSM/EDGE Radio Access Network; Mobile Radio Interface Layer 3 Specification; Radio Resource Control (RRC) Protocol (Release 7)", 3GPP TS 44.018 V7.14.0, (Sep. 2008).

Third Generation Partnership Project, "Technical Specification Group GSM/EDGE Radio Access Network; Mobile Radio Interface Layer 3 Specification; Radio Resource Control (RRC) Protocol (Release 8)", 3GPP TS 44.018 V8.0.0, (Sep. 2007).

Third Generation Partnership Project, "Technical Specification Group GSM/EDGE Radio Access Network; Mobile Radio Interface Layer 3 Specification; Radio Resource Control (RRC) Protocol (Release 8)", 3GPP TS 44.018 V8.4.0, (Sep. 2008).

ZTE Corporation, "Discussion Paper On OSC", 3GPP TSG GERAN #36 Meeting, GP-071785, (Vancouver, Canada, Nov. 12-16, 2007).

* cited by examiner

METHOD AND APPARATUS FOR SIGNALING IN MULTIPLE USER ONE-SLOT OPERATION IN WIRELESS COMMUNICATION

This application claims the benefit of U.S. Provisional Application No. 60/992,938, filed on Dec. 6, 2007, which is incorporated by reference as if fully set forth.

TECHNICAL FIELD

The present disclosure relates to wireless communications.

BACKGROUND

Approaches have been developed to allow multiple users to reuse a single timeslot in wireless systems, referred to as Multiple Users Reusing One Slot (MUROS) technologies. One such approach involves the use of orthogonal sub-channels (OSC). The OSC concept allows a wireless network to multiplex two wireless transmit/receive units (WTRUs) that are allocated the same radio resource (i.e., time slot). In the uplink direction, the sub-channels are separated by using non-correlated training sequences. The first sub-channel can use existing training sequences, and the second sub-channel can use new training sequences. Alternatively, only new training sequences may be used on the sub-channels. Using OSC can enhance voice capacity with negligible impact to WTRUs and networks. OSC can be transparently applied for all Gaussian minimum shift keying (GMSK) modulated traffic channels (e.g., for full rate traffic channels (TCH/F), half rate traffic channels (TCH/H), a related slow associated control channel (SACCH), and a fast associated control channel (FACCH)).

OSC increases voice capacity by allocating two circuit switched voice channels (i.e., two separate calls) to the same radio resource. By changing the modulation of the signal from GMSK to QPSK (where one modulated symbol represents two bits), it is relatively easy to separate two users—one user on the X axis of the QPSK constellation and a second user on the Y axis of the QPSK constellation. A single signal is used but it contains information for two different users, each user allocated their own sub-channel.

In the downlink, OSC is realized in the transmitter of a base station (BS) using a quadrature phase shift keying (QPSK) constellation that may be, for example, a subset of an 8-PSK constellation used for enhanced general packet radio service (EGPRS). Modulated bits are mapped to QPSK symbols ("dibits") so that the first sub-channel (OSC-0) is mapped to the most significant bit (MSB) and the second sub-channel (OSC-1) is mapped to the least significant bit (LSB). Both sub-channels may use individual ciphering algorithms, e.g., A5/1, A5/2 or A5/3. Several options for symbol rotation may be considered and optimized by different criteria. For instance, a symbol rotation of $3\pi/8$ would correspond to EGPRS, a symbol rotation of $\pi/4$ would correspond to $\pi/4$-QPSK, and a symbol rotation of $\pi/2$ can provide sub-channels to imitate GMSK. Alternatively, the QPSK signal constellation can be designed so that it appears like a legacy GMSK modulated symbol sequence on at least one sub-channel.

An alternate approach to realizing the MUROS concept in the downlink involves multiplexing two WTRUs together by transmitting two individual GMSK-modulated bursts per timeslot. As this approach causes increased levels of inter-symbol interference (ISI), an interference-cancelling technology such as DARP Phase I or Phase II should be employed in the receivers. Typically, during the OSC mode of operation, the BS applies downlink and uplink power control with a dynamic channel allocation (DCA) scheme to keep the difference of received downlink and/or uplink signal levels of co-assigned sub-channels within, e.g., a ±10 dB window, although the targeted value may depend on the type of receivers multiplexed together and other criteria. In the uplink, each WTRU can use a normal GMSK transmitter with an appropriate training sequence. The BS typically employs interference cancellation or joint detection type of receivers, such as a space time interference rejection combining (STIRC) receiver or a successive interference cancellation (SIC) receiver, to receive the orthogonal sub-channels used by different WTRUs.

OSC may or may not be used in conjunction with frequency-hopping or user diversity schemes, either in the downlink (DL), in the uplink (UL), or both. For example, on a per-frame basis, the sub-channels may be allocated to different pairings of users, and pairings on a per-timeslot basis may recur in patterns over prolonged period of times, such as several frame periods or block periods.

The OSC concept relies on the sub-channels remaining relatively orthogonal in the DL. When a transmission (Tx) pulse format is used that is spectrally wider than the legacy GMSK pulse format, orthogonality between two OSC sub-channels multiplexed onto the same burst is greatly improved. This also leads to improvements in link performance and receiver design. The improvement in orthogonality can be attributed to a number of causes, including reductions in time dispersion and artificial receiver distortion effects. If orthogonality between sub-channels is not properly maintained, the OSC sub-channels will greatly interfere with each other, even in absence of any actual channel impairment, and will degrade receiver performance for the multiplexed WTRUs. For example, if the legacy relatively narrow GSMK Tx pulse format is used, the pulse shaping filter will introduce ISI and perturb the orthogonality of the sub-channels in the modulated carrier. The introduced ISI may exceed acceptable levels even in static channel environments, producing a block error rate (BLER) of greater than ten percent.

Therefore, it has been proposed that pulse formats wider than the legacy GMSK pulse format be employed. One suggested format is the 270 kHz Hanning windowed Root-Raised Cosine (RRC) pulse, though it exceeds the current GSM/EDGE spectrum mask. However, a disadvantage of a spectrally wider Tx pulse is increased interference levels on channels adjacent to channels where OSC is used. The increase in interference levels may depend on UL and DL characteristics, as well as whether and to what extent frequency-hopping is employed.

Additionally, interference cancellation technology may be employed to combat increased levels of ISI. Noise cancellation technologies that could be employed include techniques such as Downlink Advanced Receiver Performance (DARP) Phase I, whereby one antenna is used and the stronger co-channel interferer on a burst is canceled out, and DARP Phase II, whereby two antennas are used.

While a wider pulse format is more robust than a narrow pulse format and offers distinct advantages when employed in the context of multiplexed or MUROS transmissions, a wider pulse format may have the undesirable side effect of affecting adjacent channels, due to increasing leakage of power ("interference") into the adjacent channels. This problem is of especial concern for legacy equipment currently in use, as it cannot be redesigned to take this into account for changed interference levels. Even with newly designed equipment, the signal-to-interference ratio (SIR) experienced in adjacent channels may be so severe as to negate possible gains in throughput offered by a wider pulse format. As a function of receiver design, legacy equipment may or may not be able to tolerate various interference levels resulting from the use of wider pulse formats. Further, inter-channel interference may occur when wider pulse formats are used in channels adjacent to channels in another operator's network. Under such a circumstance, special care must be taken when allowing WTRUs to use wider pulse formats, because different network operators do not customarily coordinate the configurations of their respective networks.

Therefore, an approach is required to allow for networks to communicate pulse format information to WTRUs, such that pulse formats on both the UL and DL may be dynamically configured or switched during operation. An approach is also required to allow for the use of a wider pulse format in MUROS transmissions while at the same time taking avoiding increased interference levels that may be caused due to constraints imposed by legacy equipment.

SUMMARY

Disclosed are multiple embodiments of method and apparatus to facilitate Multiple Users Reusing One Slot (MUROS) operation in wireless communications. A pair of wireless transmit/receive units (WTRUs) may be multiplexed onto a timeslot using a same pulse format. A WTRU may communicate on a network using MUROS technology both on the downlink (DL) and the uplink (UL), and may use a first pulse format on the DL and a second different pulse format on the UL. Pulse format support information to facilitate MUROS operation may be communicated between a network and a WTRU. The support information may be communicated in Radio Resource Control (RRC) and/or Radio Link Control/Medium Access Control (RLC/MAC) messages. A network may allow for concurrent operation of WTRUs using different types of MUROS technology. For example, a network may include WTRUs using MUROS based on orthogonal sub-channels (OSC) while other WTRUs use MUROS based on an interference-canceling technology such as Downlink Advanced Receiver Performance (DARP) Phase I or Phase II.

DETAILED DESCRIPTION

When referred to herein, the terminology "wireless transmit/receive unit (WTRU)" includes but is not limited to a user equipment (UE), a mobile station, a fixed or mobile subscriber unit, a pager, a cellular telephone, a personal digital assistant (PDA), a computer, or any other type of user device capable of operating in a wireless environment. When referred to herein, the terminology "base station" includes but is not limited to a Node-B, a site controller, an access point (AP), or any other type of interfacing device capable of operating in a wireless environment. While the embodiments are described below in the context of GSM, they are offered as examples and are to be interpreted as examples. Application of the principles of the present method and apparatus are not limited to GSM technology.

The methods and apparatus described herein are applicable to all realizations of the MUROS concept, for example using: (1) OSC multiplexed signals by means of modulation, including QPSK modulation; (2) signals relying on interference-cancelling receivers which employ, for example, Downlink Advanced Receiver Performance (DARP) technology; and (3) a combination of OSC and signals relying on interference-cancelling receivers.

Figure 1:
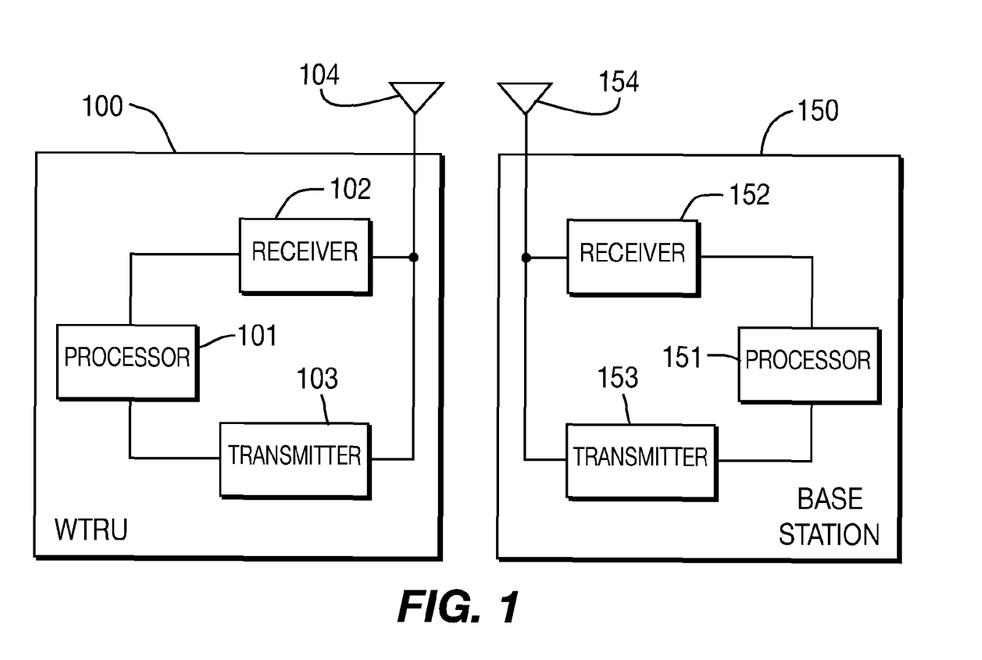
FIG. 1 is a functional block diagram of a wireless transmit/receive unit (WTRU) and a base station (BS) in accordance with the disclosed methods and apparatus.

FIG. 1 is a functional block diagram of a WTRU 100 and a base station (BS) 150 configured in accordance with the disclosed embodiments. The WTRU 100 includes a processor 101 in communication with a receiver 102, transmitter 103, and antenna 104. The BS 150 includes a processor 151 in communication with a receiver 152, transmitter 153, and antenna 154. The WTRU 100 may include additional transmitters and receivers (not depicted) in communication with the processor 101 and antenna 104 for use in multi-mode operation.

When two user signals are multiplexed onto the same timeslot, both users must use the same pulse format. For example, two WTRUs may be configured to use orthogonal sub-channels (OSC) to communicate using sub-channels of a single timeslot in the downlink (DL). A first WTRU is configured to use a wider pulse format on a first sub-channel of the timeslot. A second WTRU of the pair must then also use the wider pulse format on a second sub-channel of the timeslot. Similarly, if the first WTRU of the pair is configured to use the legacy Linearized Gaussian Minimum Shift Keying (LGMSK) pulse format, then the second WTRU of the pair must use the legacy LGMSK pulse format.

Similar principles apply to two WTRUs which are configured to use OSC to communicate using sub-channels on a single slot in the uplink (UL). For example, if one WTRU of the pair is configured to use the LGMSK pulse format on its sub-channel, then the other WTRU in the pair must also use the LGMSK pulse format for use in its sub-channel. If one WTRU of the pair is configured to use a wider pulse format, then the other WTRU of the pair must use the wider pulse format. Alternatively, if both of the WTRUs in a pairing can reliably operate different pulse forms, the network can configure the WTRUs to use different pulse forms. For example, a network may configure a first WTRU on a timeslot to use GMSK Tx pulse and configure the second WTRU on the timeslot to use a wider Tx pulse. This may be applied to both the DL and UL.

A BS may be configured to communicate individual signaling messages to both WTRUs in a WTRU pairing. The signaling messages indicate to the WTRUs the characteristics of the pulse format they should be using. After receiving these signaling messages, the WTRUs reconfigure to use pulse formats as indicated in the messages. Alternatively, a joint signaling message maybe sent from a BS to the WTRUs for conveying this information.

Figure 2:
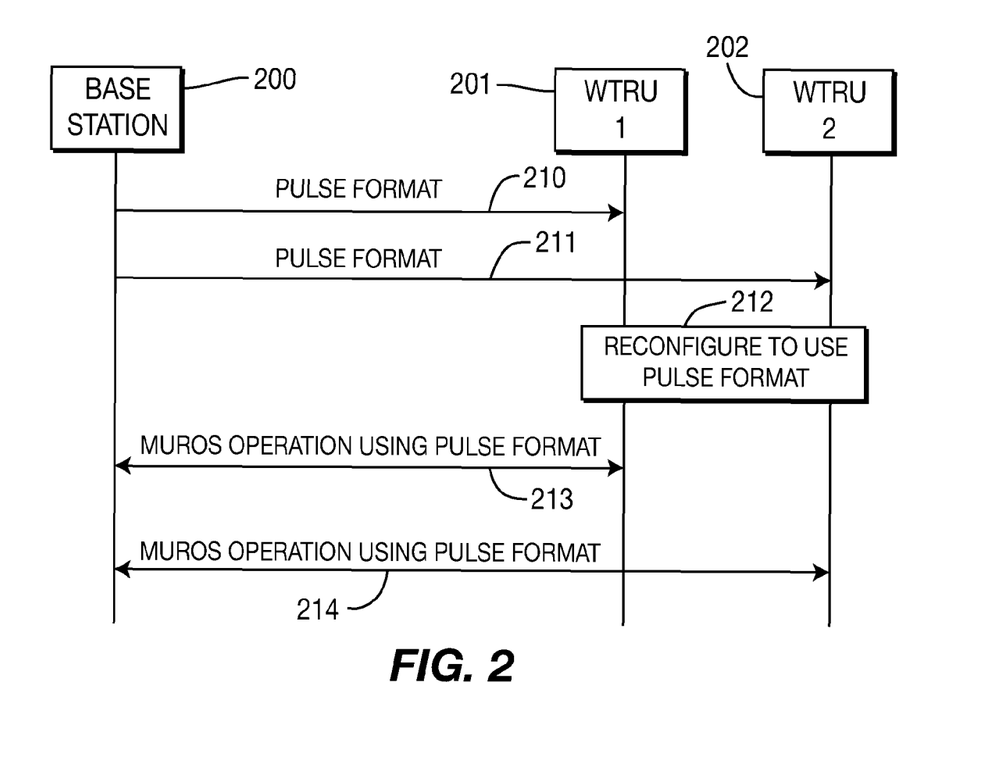
FIG. 2 is a signal diagram of a method for multiplexing of WTRUs onto a timeslot using a same pulse format.

FIG. 2 is a signal diagram in accordance with an embodiment. The WTRUs (WTRU1 201 and WTRU2 202) are multiplexed onto a single timeslot using OSC. The BS 200 sends a message at 210 to WTRU1 201 indicating a pulse format to be used by WTRU1 201. The BS 200 sends a message at 211 to WTRU2 202 indicating the pulse format to be used by WTRU2. The same pulse format is indicated to both WTRU1 201 and WTRU 202. At 212, WTRU1 and WTRU2 reconfigure to use the indicated pulse format. At 213, WTRU1 201 and the BS 200 communicate using MUROS using the indicated pulse format. At 214, WTRU2 202 and the BS 200 communicate using MUROS using the indicated pulse format. The indicated pulse format may relate to the DL or the UL.

Additionally, a WTRU using OSC may be configured to use a first pulse format in the DL and a second pulse format in the UL or to use the same pulse format in both. For example, a WTRU may be configured to receive signals using a narrow pulse format (for example, LGSMK) on an OSC sub-channel in the DL, and to simultaneously use a wide pulse format in the UL. A pair of WTRUs multiplexed on a channel may be configured to use a same narrow pulse format in the DL and configured to use a same wider pulse format in the UL. Configuration signaling as provided in FIG. 2 may be employed to inform a WTRU regarding which pulse formats should be used in the UL, DL, or both.

Figure 8:
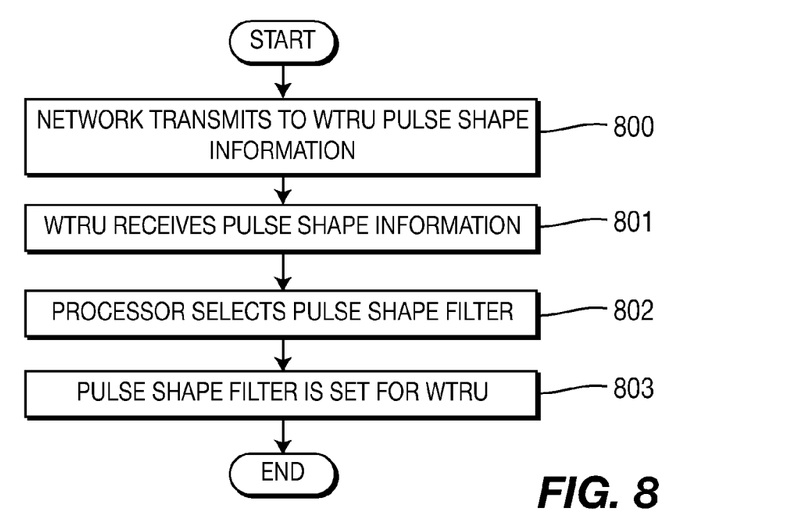
FIG. 8 is a flow diagram of reception of pulse format information and selection of a pulse format by a WTRU.

FIG. 8 is a flow diagram of a method of receiving pulse format information and selection of a pulse format by a WTRU. At 800, the network (i.e., a base station) transmits pulse shape information to a WTRU. A WTRU as described in FIG. 8 may be, for example, the WTRU1 201 or WTRU2 202 as described with respect to FIG. 2. At 801, the WTRU receives the pulse shape information. At 802, a processor in the WTRU selects a pulse shape filter to use from the received pulse shape information. At 803, the WTRU's pulse shape filter is set. After the pulse shape filter is set, the WTRU may communicate using MUROS using the selected pulse format.

Figure 3:
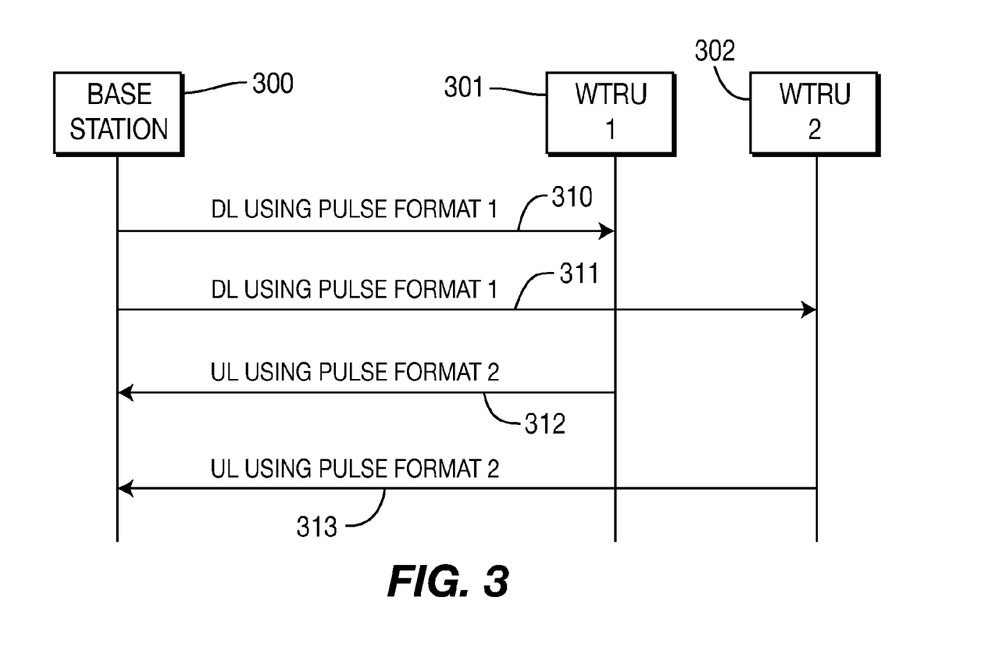
FIG. 3 is a signal diagram of a method for WTRUs using a first pulse format on the downlink and a second pulse format on the uplink.

In an additional embodiment, WTRUs using a first pulse format on the downlink and a second pulse format on the uplink. As shown in FIG. 3, a BS 300 communicates with two WTRUs (WTRU1 301 and WTRU2 302). On the DL, WTRU1 301 and WTRU2 302 are multiplexed onto a single timeslot. WTRU1 301 and WTRU 302 are configured to receive communications from the BS 300 in the DL using a first pulse format. At 310, the BS 300 communicates with WTRU1 301 on the sub-channel on the DL using the first pulse format. At 311, the BS communicates with WTRU2 302 on a sub-channel on the DL using the same first pulse format. The first pulse format could be, for example, a narrow pulse format (such as LGSMK) or a wide pulse format. WTRU1 301 and WTRU2 302 are also multiplexed onto a single timeslot on the UL, and are configured to communicate with the BS 300 on the UL using a second pulse format that is different from the first pulse format. At 312, WTRU1 301 communicates with the BS 300 on a sub-channel on the UL using a second pulse format. At 313, WTRU2 communicates with the BS 300 on a sub-channel on the UL using the second pulse format.

Figure 4:
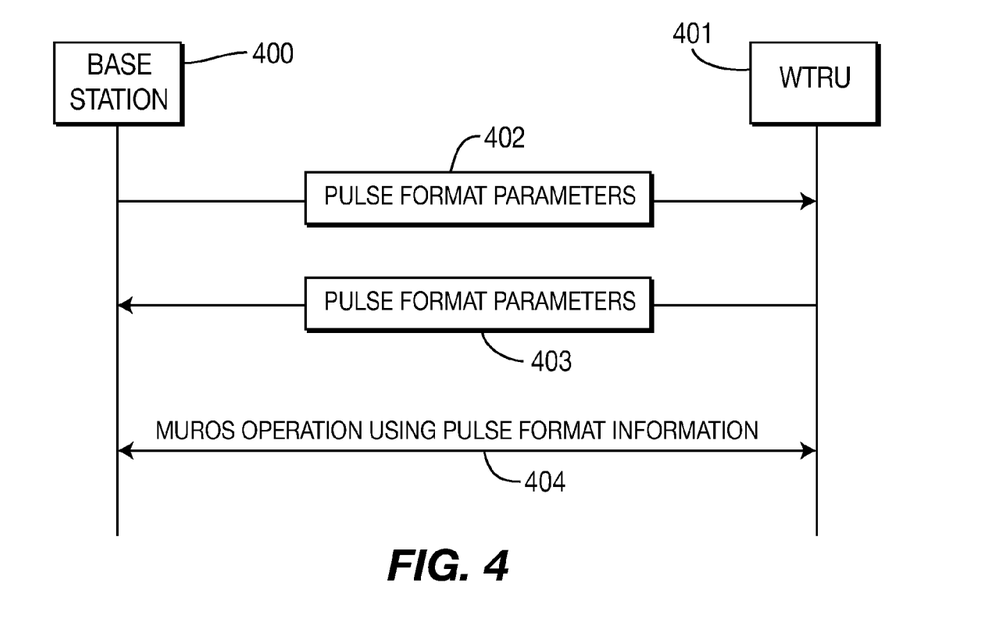
FIG. 4 is a signal diagram of a method for communicating pulse format parameters between a BS and a WTRU.
Figure 5:
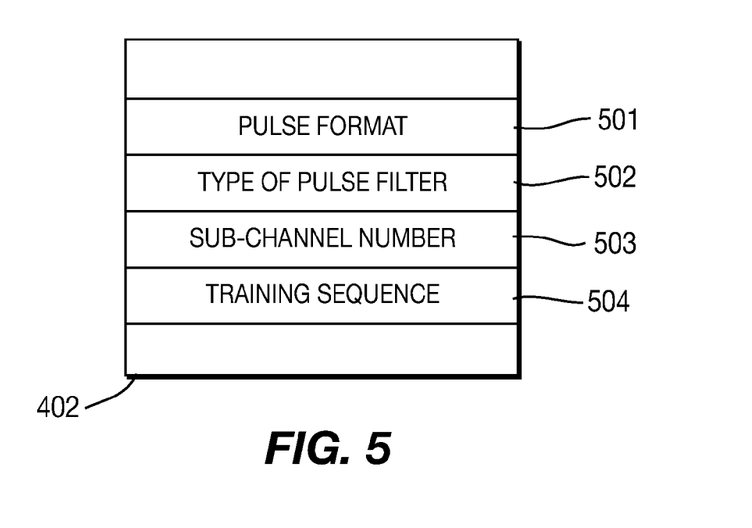
FIG. 5 is a diagram of a configuration message including pulse format information.

FIG. 4 is a signal diagram depicting the communication of MUROS configuration information between a WTRU and a BS. As seen in FIG. 4, a BS 400 sends a configuration message 402 to a WTRU 401. The configuration message 402 includes parameters necessary for configuration for MUROS operation. The configuration message 402 may be sent during configuration or set up procedures, including a procedure for set up of a Traffic Channel (TCH). The parameters in the configuration message 402 are shown in further detail in FIG. 5. Referring to FIG. 5, the parameters in the configuration message 402 may include (either separately or in arbitrary combination) the following: pulse format information 501, indicating a format and/or type of modulation used (applicable pulse formats may include but are not limited to, for example, GMSK and QPSK); pulse filter type information 502 (applicable filter types may include but are not limited to, for example, LGMSK and Root Raised Cosine (RRC) wideband); an applicable sub-channel number 503; and a training sequence code (TSC) 504. These parameters may be specific to either the UL or the DL direction. If the network chooses to apply Frequency Hopping technique as well, the needed parameters, such as Mobile Allocation, Hopping Sequence Number and Mobile Allocation Index Offset, shall also be signaled to the WTRU. Alternatively, one or more of these signaled parameters may be combined and when signaled are applicable to both DL and UL. As shown, other parameters may also be specified at a later date.

The network (BS) may inform a WTRU about these parameters in several alternative ways. For example, the configuration message 402 may be an instance of one of the following Radio Resource Control (RRC) message types: Assignment Command; Additional Assignment; Channel Mode Modify; Handover Command; Immediate Assignment; Immediate Assignment Extended; Channel Release; and Partial Release.

Referring back to FIG. 4, a WTRU may indicate support of a pulse format or multiple pulse formats by indicating capabilities in a message communicated to the network. An example of this is shown in FIG. 4 where the WTRU 401 sends a message 403 to the BS 400. The message 403 includes supported pulse format information. The message 403 may be, as an example, an instance of an RRC message such as a Classmark Change message. Pulse format information may be indicated in an information element (IE) such as a Classmark 3 IE or a Radio Access Capability IE. The message 403 may be sent following or in response to a request or response message such as a CM Service Request message (which indicates a mobile-originated call), or after a Paging Response message (which indicates a mobile-terminated call). The pulse format support information included in the message 403 may indicate support for a narrow pulse format, a wide pulse format, or for both narrow and wide pulse formats. The pulse format support information included in the message 403 may relate to the UL or the DL.

At 404, the WTRU 401 and the BS 400 communicate using MUROS using a pulse format based on the information exchanged in the messages 402 and/or 403. The signaling and related operations depicted in FIG. 4 may be performed in any arbitrary combination or sub-combination, in any order.

According to an embodiment, multiple MUROS approaches may be employed simultaneously in a single network. When used herein, "Type 1 MUROS" refers to MUROS using OSC. "Type 2 MUROS" refers to MUROS relying on interference-cancelling receivers which employ, for example, DARP technologies. A "Type 3" WTRU refers to a WTRU that is capable of both Type 1 and Type 2 MUROS operation.

A network may simultaneously implement Type 1 MUROS and Type 2 MUROS. WTRUs configured to implement Type 1 MUROS or Type 2 MUROS may co-exist on the network. Type 3 WTRU may co-exist on the network with Type 1 and Type 2 WTRUs.

A WTRU may indicate its support for Type 1 or Type 2 MUROS operation to the network. Only WTRUs using a compatible type of MUROS receiver may be multiplex together onto a single DL timeslot. For example, two WTRUs supporting Type 1 MUROS may be multiplexed onto one DL timeslot, but a first WTRU that supports only Type 1 MUROS may not be multiplexed onto a DL timeslot with a second WTRU that supports only Type 2 MUROS. However, a Type 3 WTRU may be multiplexed with either a Type 1 WTRU or a Type 2 WTRU.

Figure 6:
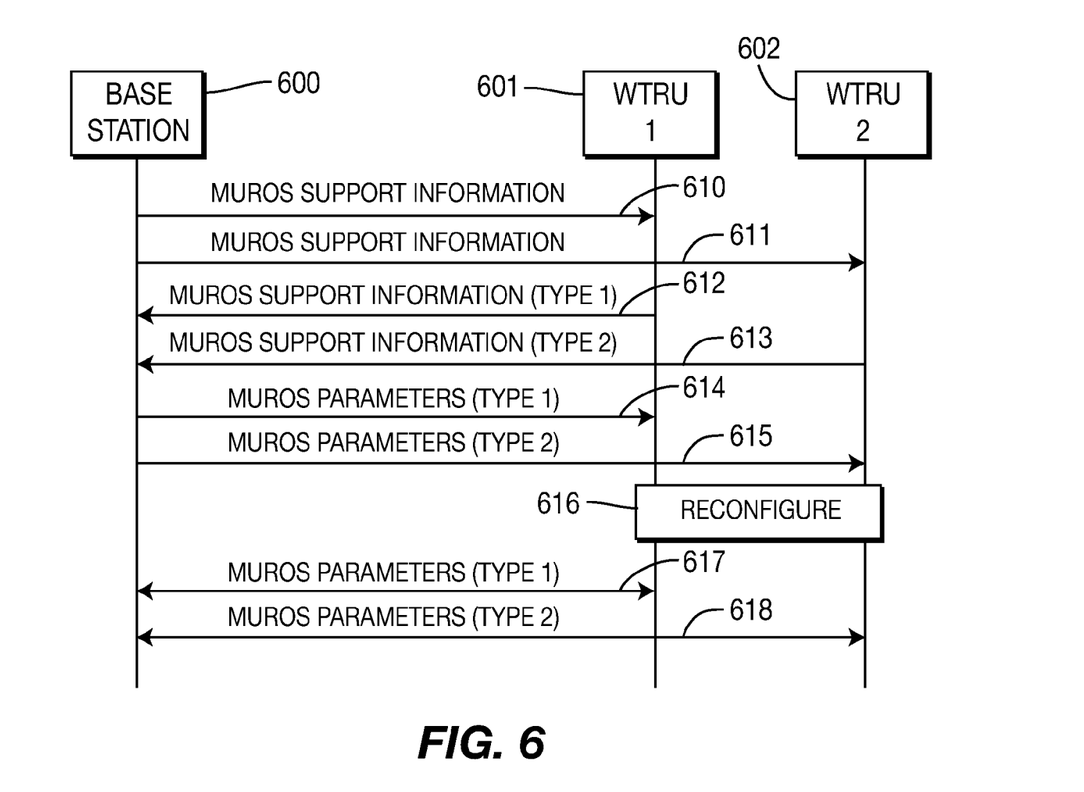
FIG. 6 is a signal diagram of a method for multiple WTRUs communicating on a network using more than one type of MUROS operation.

A method to allocate resources in a network using more than one type of MUROS operation is shown in FIG. 6. A base station 600 may communicate to WTRUs its support for Type 1 MUROS, Type 2 MUROS, or both, depending on the capabilities of the network. As seen in FIG. 6, at 610 the base station 600 sends a message to WTRU1 601, indicating its support for the MUROS options. The message may indicate support for Type 1 MUROS, Type 2 MUROS, or both, depending upon the capabilities of the base station 600. The message may be a system information message. At 611, the base station 600 communicates to WTRU2 602, indicating the MUROS options supported by the base station 600.

A WTRU may communicate to the network its support for Type 1 MUROS, Type 2 MUROS, or both. As seen in FIG. 6, at 612 WTRU1 601 communicates its support for MUROS operation, including support for Type 1 or Type 2 operation, by sending a message to the base station 600. The message may also include other characteristics and features of MUROS operation supported by the WTRU. The message may be a Classmark Change message, and MUROS support may be indicated in the Classmark 3 IE. The message may be sent subsequent or in response to a request or response message such as a CM Service Request or Paging Response message. At 613, WTRU2 communicates its support for MUROS operation using the same mechanism as used by WTRU1 601 at 612. In this example, WTRU1 601 supports Type 1 MUROS and this is indicated in the communication sent to the base station 600 at 612. Further to this example, WTRU2 602 supports Type 2 MUROS and this is indicated in the communication sent to base station 600 at 613.

The network may communicate to the WTRU parameters relating to MUROS operation according to Type 1 MUROS or Type 2 MUROS. The RRC messages described above with respect to the third embodiment may be used for this purpose. By way of the example depicted in FIG. 6, at 614 the base station 600 communicates MUROS parameter information to WTRU1 601 relating to use of Type 1 MUROS. At 615, the base station 600 transmits MUROS parameter information to WTRU2 602 relating to the use of Type 2 MUROS.

A WTRU may reconfigure itself to communicate with the network using the MUROS parameters as sent by the network and then communicate with the network using MUROS. As shown in FIG. 6, at 616 WTRU1 601 and WTRU 602 reconfigure to communicate using MUROS according to the parameters sent at 614 and 615. According to this example, WTRU1 601 reconfigures to use Type 1 MUROS and WTRU2 602 reconfigures to use Type 2 MUROS. After reconfiguration, at 617 WTRU1 601 communicates with the base station 600 using Type 1 MUROS and at 618 WTRU2 602 concurrently communicates with the base station 600 using Type 2 MUROS.

The signaling and related operations depicted in FIG. 6 may be performed in any arbitrary combination or sub-combination, in any order.

Figure 7:
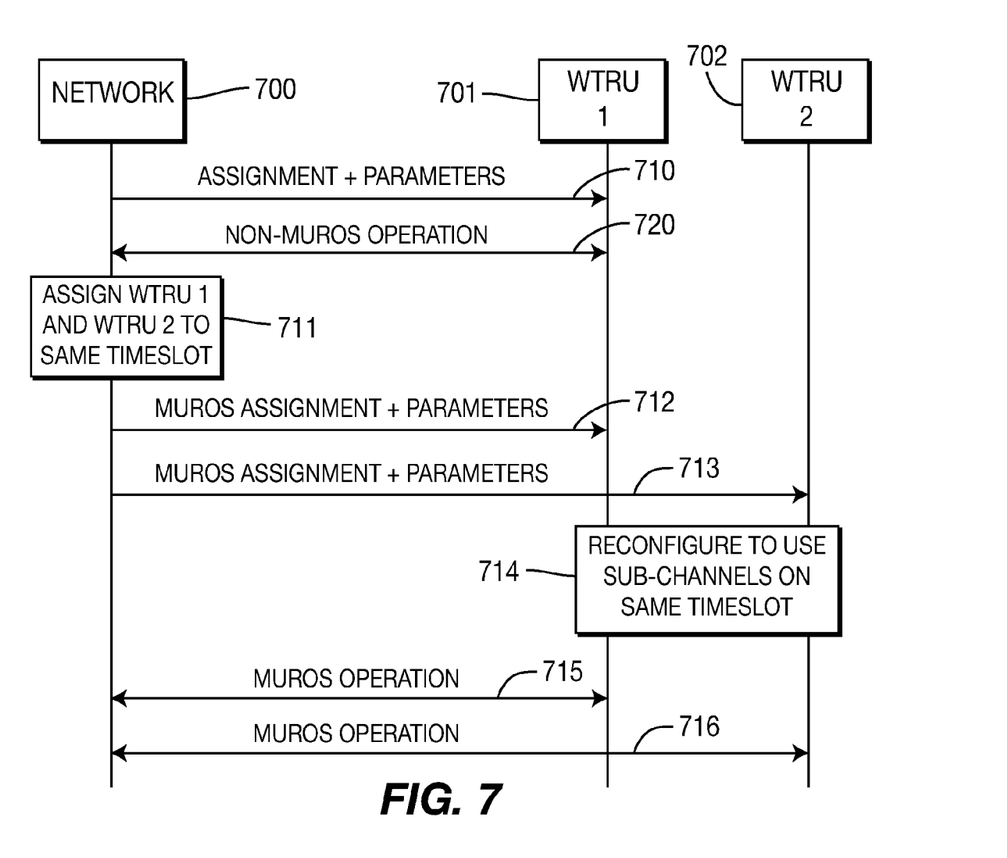
FIG. 7 is a signal diagram of a method for multiple WTRUs to be multiplexed onto a single timeslot after one WTRU of the pair operates on the network using legacy (non-MUROS) technology.

According to an embodiment, a base station may assign a timeslot to a first WTRU and subsequently make a determination to multiplex another WTRU onto the timeslot. Referring to FIG. 7, the base station 700 sends a message to WTRU1 701 at 710, assigning the WTRU to the timeslot. This message includes parameters WTRU1 701 uses to configure itself to use the timeslot according to legacy operation. At 720, WTRU1 and the base station 700 communicate without using MUROS.

At 711, a determination is made on the network 711 to multiplex a second WTRU (WTRU2 702) onto the timeslot. At 712, the base station 700 communicates to WTRU1 701, indicating new parameters to be used by WTRU1 701 to continue using the timeslot using MUROS. The parameters may include, for example, the modulation, type of pulse filter, sub-channel number, and training code sequence to be used. This may be performed by sending a message. The message may be, for example, an Assignment Command message. At 713, the base station 700 communicates to WTRU2 702, indicating new parameters for WTRU2 702 to use the timeslot using MUROS, such that WTRU1 701 and WTRU2 702 will be multiplexed onto the timeslot.

At 714, WTRU1 701 reconfigures to use the new parameters and thereby use MUROS to communicate on a sub-channel on the timeslot. WTRU2 702 also reconfigures to begin communicating using MUROS, using a different sub-channel on the timeslot. At 715 and 716, WTRU1 701 and WTRU2 702 concurrently communicate with the base station 700 on the same timeslot using MUROS.

The signaling and related operations depicted in FIG. 7 may be performed in any arbitrary combination or sub-combination, in any order.

As describe in the above Figures, WTRUs may operate in a network using OSC using wide and narrow pulse formats. In addition to operation involving wide and narrow formats, networks may operate using more than one alternative wider Tx pulse. For example, a network including WTRUs and at least one BS may support a legacy GMSK pulse format in addition to more than one alternative wider Tx pulse. In such networks, the methods and apparatus of the above-described Figures may be employed (modified where necessary) to configure WTRUs to use the narrower and the multiple wider pulse formats.

Additionally, pulse format configurations may be derived in a network implicitly or based on network characteristics. For example, a network may be configured such that a signaled channel configuration or other parameters indicate a pulse format to be used in a given context. Parameters which may be used for this purpose include frame numbers, sequences or index value(s), occurrences of frequency-hopping, and other patterns.

Referring back to FIG. 1, the WTRU 100 and base station 150 may be configured to operate according to the methods and apparatus as described in the above Figures. In the WTRU 100, the processor 101 may be configured to generate and process signals and messages as related in the above Figures. The receiver 102 of the WTRU 100 may be configured to receive signals and messages and the transmitter 103 of the WTRU 100 may be configured to send signals and messages as related in the above Figures. The processor 151 of the base station 150 may be configured to generate and process signals and messages as related in the above Figures. The receiver 152 of the base station 150 may be configured to receive signals and messages and the transmitter 153 of the base station 150 may be configured to send signals and messages as related in the above Figures.

Although the features and elements are described in the embodiments in particular combinations, each feature or element may be used alone without the other features and elements or in various combinations with or without other features and elements. The methods or flow charts provided may be implemented in a computer program, software, or firmware tangibly embodied in a computer-readable storage medium for execution by a general purpose computer or a processor. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine.

A processor in association with software may be used to implement a radio frequency transceiver for use in a wireless transmit receive unit (WTRU), user equipment (UE), terminal, base station, radio network controller (RNC), or any host computer. The WTRU may be used in conjunction with modules, implemented in hardware and/or software, such as a camera, a video camera module, a videophone, a speakerphone, a vibration device, a speaker, a microphone, a television transceiver, a hands free headset, a keyboard, a Bluetooth® module, a frequency modulated (FM) radio unit, a liquid crystal display (LCD) display unit, an organic light-emitting diode (OLED) display unit, a digital music player, a media player, a video game player module, an Internet browser, and/or any wireless local area network (WLAN) module.

What is claimed is:

1. A method implemented in a wireless transmit/receive unit (WTRU), the method comprising:
   the WTRU transmitting a capability message that includes a field that indicates that the WTRU supports a pulse format, wherein the pulse format is one of a narrow pulse format, a first wide pulse format, or a second wide pulse format;
   the WTRU receiving a configuration message that includes a field that indicates that the pulse format is to be used by the WTRU; and
   the WTRU communicating on an orthogonal sub-channels (OSC) sub-channel in response to the configuration message, wherein the OSC sub-channel is one of a pair of OSC sub-channels on a time slot.

2. The method of claim 1 wherein the capability message and the configuration message are Radio Resource Control (RRC) messages.

3. The method of claim 2 wherein the configuration message is one of an Assignment Command message, an Additional Assignment message, a Channel Mode Modify message, a Handover Command message, an Immediate Assignment message, an Immediate Assignment Extended, a Channel Release, or a Partial Release message.

4. The method of claim 2 wherein the field that indicates that the WTRU supports a pulse format is a Classmark 3 Information Element (IE) or a Radio Access Capability Information Element (IE).

5. The method of claim 2 wherein the using the pulse format to communicate on the OSC sub-channel is performed on the uplink (UL) or on the downlink (DL).

6. A wireless transmit receive unit (WTRU), comprising:
   a transmitter configured to transmit a capability message, that includes a field that indicates that the WTRU supports a pulse format, wherein the pulse format is one of a narrow pulse format, a first wide pulse format, or a second wide pulse format;
   a receiver configured to receive a configuration message that includes a field that indicates that the WTRU pulse format is to be used by the WTRU; and
   wherein either the transmitter or the receiver is further configured, in response to the configuration message, to communicate on an orthogonal sub-channels (OSC) sub-channel using the pulse format, wherein the OSC sub-channel is one of a pair of OSC sub-channels on a time slot.

7. The WTRU of claim 6 wherein the capability message and the configuration message are radio resource control (RRC) messages.

8. The WTRU of claim 7 wherein the configuration message is one of an Assignment Command message, Additional Assignment message, Channel Mode Modify message, Handover Command message, Immediate Assignment message, Immediate Assignment Extended message, Channel Release message, or Partial Release message.

9. The WTRU of claim 7 wherein the field that indicates that the WTRU supports a pulse format is a Classmark 3 or a Radio Access Capability Information Element (IE).

10. The WTRU of claim 7 wherein the transmitter is configured to use the pulse format on the uplink (UL) or the receiver is configured to use the pulse format on the downlink (DL).

11. A network node, comprising:
    a receiver configured to receive a capability message from a wireless transmit/receive unit (WTRU) that includes a field that indicates that the WTRU supports a pulse format, wherein the pulse format is one of a narrow pulse format, a first wide pulse format, or a second wide pulse format; and
    a transmitter configured to transmit a configuration message, that includes a field that indicates that the WTRU pulse format is to be used by the WTRU;
    wherein either the transmitter or the receiver is further configured, in response to the configuration message, to communicate on an orthogonal sub-channels (OSC) sub-channel using the pulse format, wherein the OSC sub-channel is one of a pair of OSC sub-channels on a time slot.

12. The network node of claim 11, wherein the capability message and the configuration message are radio resource control (RRC) messages.

13. The network node of claim 12, wherein the configuration message is one of an Assignment Command message, Additional Assignment message, Channel Mode Modify message, Handover Command message, Immediate Assignment message, Immediate Assignment Extended message, Channel Release message, or Partial Release message.

14. The network node of claim 12, wherein the field that indicates that the WTRU supports a pulse format is a Classmark 3 or a Radio Access Capability Information Element (IE).

15. The network node of claim 12, wherein the transmitter is configured to use the pulse format on the downlink (DL) or the receiver is configured to use the pulse format on the uplink (UL).

* * * * *